United States Patent
Zhu et al.

(10) Patent No.: US 11,252,301 B2
(45) Date of Patent: Feb. 15, 2022

(54) ADJUSTING SHARPNESS AND DETAILS IN UPSCALING OUTPUT

(71) Applicants: Sony Corporation, Tokyo (JP); Sony Pictures Entertainment Inc., Culver City, CA (US)

(72) Inventors: Miaoqi Zhu, Studio City, CA (US); Yoshikazu Takashima, Los Angeles, CA (US)

(73) Assignees: Sony Corporation, Tokyo (JP); Sony Pictures Entertainment Inc., Culver City, CA (US)

( * ) Notice: Subject to any disclaimer, the term of this patent is extended or adjusted under 35 U.S.C. 154(b) by 147 days.

(21) Appl. No.: 16/442,147

(22) Filed: Jun. 14, 2019

(65) Prior Publication Data

US 2020/0126194 A1 Apr. 23, 2020

Related U.S. Application Data

(60) Provisional application No. 62/747,453, filed on Oct. 18, 2018.

(51) Int. Cl.
*G06K 9/62* (2006.01)
*H04N 1/60* (2006.01)
(Continued)

(52) U.S. Cl.
CPC ......... *H04N 1/6027* (2013.01); *G06K 9/4652* (2013.01); *G06K 9/6256* (2013.01); *G06N 3/02* (2013.01); *G06N 20/00* (2019.01); *G06T 3/4046* (2013.01); *G06T 3/4053* (2013.01); *G06T 3/4076* (2013.01); *G06T 5/003* (2013.01);
(Continued)

(58) Field of Classification Search
None
See application file for complete search history.

(56) References Cited

U.S. PATENT DOCUMENTS

| 5,237,624 A | 8/1993 | Okamoto |
| 8,395,708 B2 | 3/2013 | Lee et al. |

(Continued)

FOREIGN PATENT DOCUMENTS

| EP | 1164781 A1 | 12/2001 |
| JP | 6349703 B | 7/2018 |
| WO | 2017124036 A1 | 7/2017 |

OTHER PUBLICATIONS

Uchida et al., "Non-blind image restoration based on convolutional neural network." In 2018 IEEE 7th Global Conference on Consumer Electronics (GCCE), pp. 40-44. Oct. 9-12, 2018. Nara, Japan. (Year: 2018).*

(Continued)

*Primary Examiner* — Feng Niu
(74) *Attorney, Agent, or Firm* — Procopio, Cory, Hargreaves & Savitch LLP

(57) ABSTRACT

Enabling adjustment of sharpness and details of an input image in upscaling, including: applying a Fourier transform function on a brightness channel of the input image to generate a 2-D frequency map; adjusting the 2-D frequency map to control a target amount of sharpness and details in an upscaled output image; and using the adjusted 2-D frequency map as an additional input channel along with standard color image data for a training and upscaling process.

10 Claims, 6 Drawing Sheets

(51) Int. Cl.
  *G06K 9/46* (2006.01)
  *G06T 3/40* (2006.01)
  *G06N 3/02* (2006.01)
  *G06T 7/11* (2017.01)
  *G06N 20/00* (2019.01)
  *G06T 9/00* (2006.01)
  *G06T 7/13* (2017.01)
  *G06T 5/00* (2006.01)
  *G06T 5/10* (2006.01)

(52) U.S. Cl.
  CPC ............ *G06T 5/10* (2013.01); *G06T 7/11* (2017.01); *G06T 7/13* (2017.01); *G06T 9/002* (2013.01); *G06T 2207/10024* (2013.01); *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 9,865,037 B2 | 1/2018 | Salvador Marcos | |
| 10,032,256 B1 | 7/2018 | Anaya | |
| 10,091,479 B2 | 10/2018 | Barron et al. | |
| 2004/0218834 A1 | 11/2004 | Bishop | |
| 2014/0267283 A1 | 9/2014 | Nystad et al. | |
| 2015/0117762 A1 | 4/2015 | Shibata | |
| 2017/0132759 A1 | 5/2017 | Perez Pellitero | |
| 2017/0256033 A1 | 9/2017 | Tuzel | |
| 2018/0129893 A1* | 5/2018 | Son | G06N 3/04 |
| 2018/0158177 A1 | 6/2018 | Lannes et al. | |
| 2019/0045168 A1 | 2/2019 | Chaudhuri | |
| 2020/0051211 A1 | 2/2020 | Shiokawa | |
| 2020/0058112 A1* | 2/2020 | Wang | G06T 7/90 |
| 2020/0126183 A1 | 4/2020 | Zhu | |

OTHER PUBLICATIONS

Wikipedia, Luma (Video), published on Dec. 13, 2017 (Year: 2017).*
Wikipedia, YCbCr, published on Oct. 3, 2017 (Year: 2017).*
Yu et al., "Super-Resolving Very Low-Resolution Face Images with Supplementary Attributes." In 2018 IEEE/CVF Conference on Computer Vision and Pattern Recognition, pp. 908-917. Jun. 18-23, 2018. Salt Lake City, UT, USA (Year: 2018).*
International Search Report and Written Opinion in related PCT Application No. PCT/US2019/056681, dated Jan. 30, 2020, 7 pages.
Dong et al., "Image Super-Resolution Using Deep Convolutional Networks", IEEE, arXiv:1501.00092v3 [cs CV] Jul. 31, 2015; pp. 1-14.
Shcherbinin et al., "Sharpening Image Details Using Local Phase Congruency Analysis", Society for Imaging Science and Technology, https://doi.org/10.2352/ISSN.2470-1173.2018.13.IPAS-218; pp. 218-1-218-5.

* cited by examiner

Fourier Transform

Enhancement (e.g., gain)

Learning with 3 image channels per pixel

Learning with 4 image channels per pixel (target grand truth image frequency)

Learning with 4 image channels per pixel (target enhanced frequency – more details than the grand truth image)

ADJUSTING SHARPNESS AND DETAILS IN UPSCALING OUTPUT

CROSS-REFERENCE TO RELATED APPLICATIONS

This application claims the benefit of priority under 35 U.S.C. § 119(e) of U.S. Provisional Patent Application No. 62/747,453, filed Oct. 18, 2018, entitled "Machine-Learning Based Single Image Upscaling Application for Motion Pictures." The disclosure of the above-referenced application is incorporated herein by reference.

BACKGROUND

Field

The present disclosure relates to upscaling, and more specifically, to enabling adjustment of sharpness and details of an input image in upscaling.

Background

Machine learning (ML) can be used to perform image super-resolution upscaling. However, the conventional ML-based training and upscaling process has some observed issues. For example, other than providing sharper images with the desired amount of details, there is no direct control on how much sharpness and level of details the training and upscaling process should achieve in the output. Thus, the conventional upscaling process is programmed to make the quality of the output image as close as possible to the reference ground truth image. If the ground truth image does not have a preferred amount of sharpness or details, the training process does not add any additional details beyond the existing detail included in the ground truth image.

SUMMARY

The present disclosure provides for enabling adjustment of sharpness and details of an input image in upscaling.

In one implementation, a method for enabling adjustment of sharpness and details of an input image in upscaling is disclosed. The method includes: applying a Fourier transform function on a brightness channel of the input image to generate a 2-D frequency map; adjusting the 2-D frequency map to control a target amount of sharpness and details in an upscaled output image; and using the adjusted 2-D frequency map as an additional input channel along with standard color image data for a training and upscaling process.

In one implementation, using the adjusted 2-D frequency map as an additional input channel includes inputting the adjusted 2-D frequency map into an ML-based upscaler along with the standard color image data. In one implementation, the brightness channel includes a luminance channel of the input image. In one implementation, adjusting the 2-D frequency map includes applying a gain factor onto a higher frequency area of the 2-D frequency map to generate an enhanced frequency map. In one implementation, the method further includes using the enhanced frequency map as a target for sharpness and details. In one implementation, using the enhanced frequency map as the target includes adjusting the 2-D frequency map as close as possible to the target of the enhanced frequency map to add more details and sharpen the upscaled output image.

In another implementation, sharpness adjusting system for enabling adjustment of sharpness and details of an input image in upscaling is disclosed. The system includes: a Fourier transform unit configured to apply a Fourier transform function on a brightness channel of the input image to generate a 2-D frequency map; and a frequency map adjuster configured to adjust the 2-D frequency map to control sharpness and details in an upscaled output image.

In one implementation, the adjusted 2-D frequency map is fed into an ML-based upscaler along with standard color image data. In one implementation, the brightness channel comprises a luminance channel of the input image. In one implementation, the frequency map adjuster is also configured to apply a gain factor onto a higher frequency area of the 2-D frequency map to generate an enhanced frequency map.

In yet another implementation, a non-transitory computer-readable storage medium storing a computer program to enable adjustment of sharpness and details of an input image in upscaling is disclosed. The computer program includes executable instructions that cause a computer to: apply a Fourier transform function on a brightness channel of the input image to generate a 2-D frequency map; adjust the 2-D frequency map to control a target amount of sharpness and details in an upscaled output image; and use the adjusted 2-D frequency map as an additional input channel along with standard color image data for a training and upscaling process.

In one implementation, the executable instructions that cause the computer to use the adjusted 2-D frequency map as an additional input channel include the executable instructions that cause the computer to input the adjusted 2-D frequency map into an ML-based upscaler along with the standard color image data. In one implementation, the brightness channel includes a luminance channel of the input image. In one implementation, the executable instructions that cause the computer to adjust the 2-D frequency map include the executable instructions that cause the computer to apply a gain factor onto a higher frequency area of the 2-D frequency map to generate an enhanced frequency map. In one implementation, the non-transitory computer-readable storage medium further includes executable instructions that cause the computer to use the enhanced frequency map as a target for sharpness and details. In one implementation, the executable instructions that cause the computer to use the enhanced frequency map as the target include the executable instructions that cause the computer to adjust the 2-D frequency map as close as possible to the target of the enhanced frequency map to add more details and sharpen the upscaled output image.

Other features and advantages should be apparent from the present description which illustrates, by way of example, aspects of the disclosure.

BRIEF DESCRIPTION OF THE DRAWINGS

The details of the present disclosure, both as to its structure and operation, may be gleaned in part by study of the appended drawings, in which like reference numerals refer to like parts, and in which.

DETAILED DESCRIPTION

As described above, the conventional ML-based training and upscaling process has some observed issues. For example, there is no direct control on how much sharpness and level of details the training and upscaling process should achieve in the output except for providing sharper images with the desired amount of details. However, when there is a need for enhancing sharpness and details, extra steps are needed to be implemented in the learning process.

To address the above-stated issues with the conventional process, certain implementations of the present disclosure provide for: (1) running Fourier Transform function on a brightness channel such as the luminance channel (e.g., Y channel of YCbCr image data) of the input image to generate a 2-D frequency map; (2) using the 2-D frequency map as an additional channel (i.e., in addition to the RGB or YCbCr image data) in the input data into the training process; and (3) adjusting the frequency map of the ground truth image to control the target amount of sharpness and details in the upscaled output.

One example of adjusting the frequency map includes applying a gain factor onto the higher frequency area of the frequency map to generate an enhanced frequency map. The enhanced frequency map is then used as the target in terms of sharpness and/or details. The optimization process adjusts the frequency map of the output image as close as possible to the enhanced target, which will add more details and/or generate sharper image.

After reading these descriptions, it will become apparent how to implement the disclosure in various implementations and applications. Although various implementations of the present disclosure will be described herein, it is understood that these implementations are presented by way of example only, and not limitation. As such, this detailed description of various implementations should not be construed to limit the scope or breadth of the present disclosure.

As mentioned above, the conventional upscaling process adjusts the quality of the output image as close as possible to the reference ground truth image. In the case where the ground truth image does not have a preferred amount of sharpness or details, the training process will not add any details beyond the details included in the ground truth image. However, when there is a need for enhancing sharpness and details, extra steps are needed to be implemented in the training process.

Figure 1A:
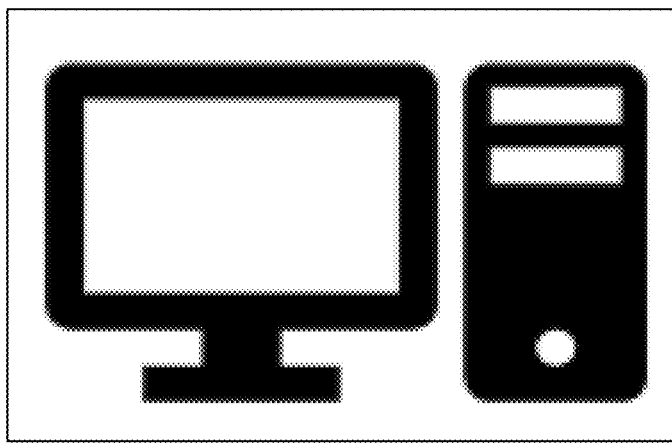
FIGS. 1A through 1C form a flow diagram illustrating a process for enabling adjustment of sharpness and details in the upscaled output in accordance with one implementation of the present disclosure.
Figure 1A:
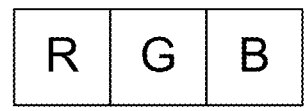
Figure 1B:
Figure 1B:
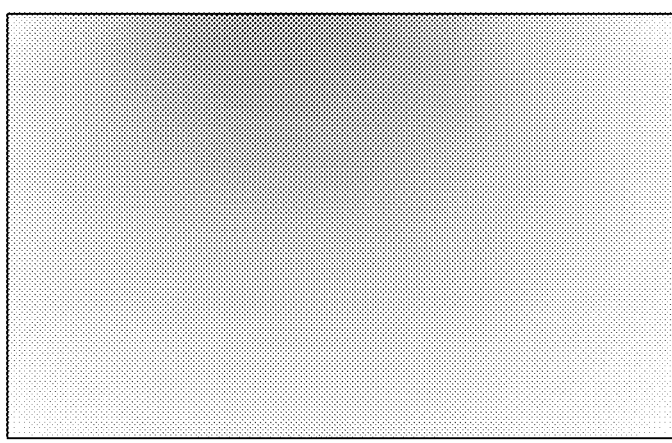
Figure 1B:
Figure 1C:
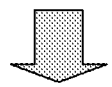
Figure 1C:
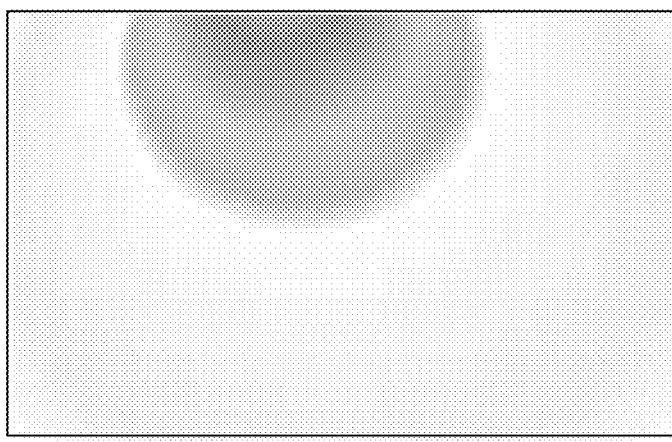
Figure 1C:
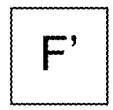

FIGS. 1A through 1C form a flow diagram illustrating a process for enabling adjustment of sharpness and details in the upscaled output in accordance with one implementation of the present disclosure. The illustrated implementation of FIG. 1A shows an RGB input image data 100. FIG. 1B shows the result 110 of running Fourier Transform function on the brightness channel (e.g., the luminance channel) of the input image to generate a 2-D frequency map.

FIG. 1C shows the result 120 of using the 2-D frequency map as an additional channel (i.e., in addition to the RGB image data shown in FIG. 1A) in the input data into the training process. The frequency map of the ground truth image is then adjusted to control the target amount of sharpness and details in the upscaled output. As shown in FIG. 1C, the frequency map may be adjusted by applying a gain factor onto the higher frequency area of the frequency map to generate an enhanced frequency map. The enhanced frequency map is then used as the target in terms of sharpness and/or details. Thus, the optimization process adjusts the frequency map of the output image as close as possible to the enhanced target, which will add more details and/or generate sharper image.

Figure 2A:
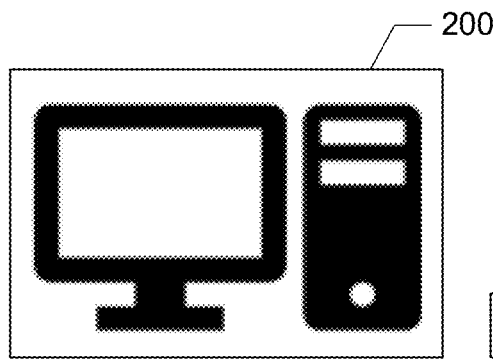
FIGS. 2A through 2C form a flow diagram illustrating the different levels of training and upscaling in accordance with one implementation of the present disclosure.
Figure 2B:
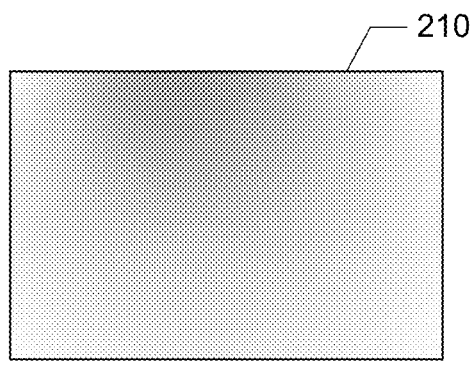
Figure 2C:
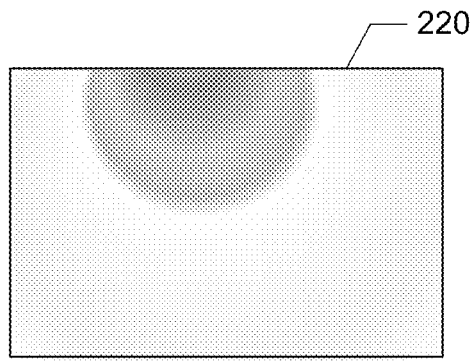

FIGS. 2A through 2C form a flow diagram illustrating the different levels of training and upscaling in accordance with one implementation of the present disclosure. The illustrated implementation of FIG. 2A shows the training and upscaling with three image channels 200 per pixel (i.e., the RGB channels). The illustrated implementation of FIG. 2B shows the training and upscaling with four image channels per pixel with the target grand truth image frequency channel 210 as an additional channel to the three RGB channels. The illustrated implementation of FIG. 2C shows the training and upscaling with four image channels per pixel, with the target enhanced frequency channel 220, which provides more details than the grand truth image, as an additional channel to the three RGB channels.

Figure 3:
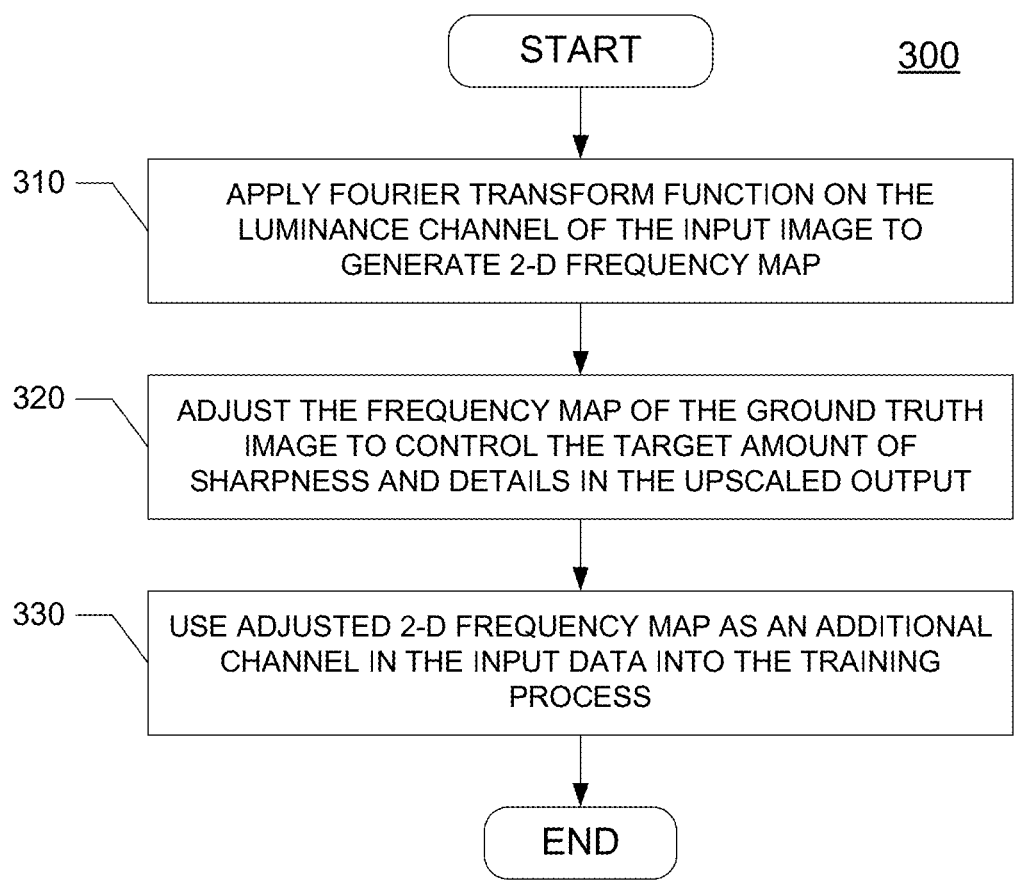
FIG. 3 is a flow chart illustrating a process for enabling adjustment of sharpness and details in an input image in accordance with one implementation of the present disclosure.

FIG. 3 is a flow chart illustrating a process 300 for enabling adjustment of sharpness and details of an input image in upscaling in accordance with one implementation of the present disclosure. In the illustrated implementation of FIG. 3, extra steps are taken in the training process to enhance the sharpness and details.

In one implementation, a Fourier Transform function is applied on the brightness channel (e.g., the luminance channel (Y) when the input image is YCbCr) of the input image, at block 310, to generate a 2-D frequency map of the grand truth image. In another implementation, a parameter other than luminance, which can provide the sharpness and level of details, can be used. For example, for non-live capture content, there can be an image where Y is uniform, but only Cb and/or Cr channel changes. This situation provides same luminance level but colorful computer graphics (CG) image. To extract sharpness of color patterns, where luminance does not give the color pattern edge/frequency information, the 2D frequency map of other channels can be utilized.

The frequency map of the ground truth image is adjusted, at block 320, to control the target amount of sharpness and details in the upscaled output. The adjusted 2-D frequency map is then used as an additional channel (i.e., in addition to the standard color data such as RGB or YCbCr image data) in the input data into the training process, at block 330. In one implementation, the adjusted 2-D frequency map is input into an ML-based upscaler along with the standard color image data for training and upscaling.

Figure 4:
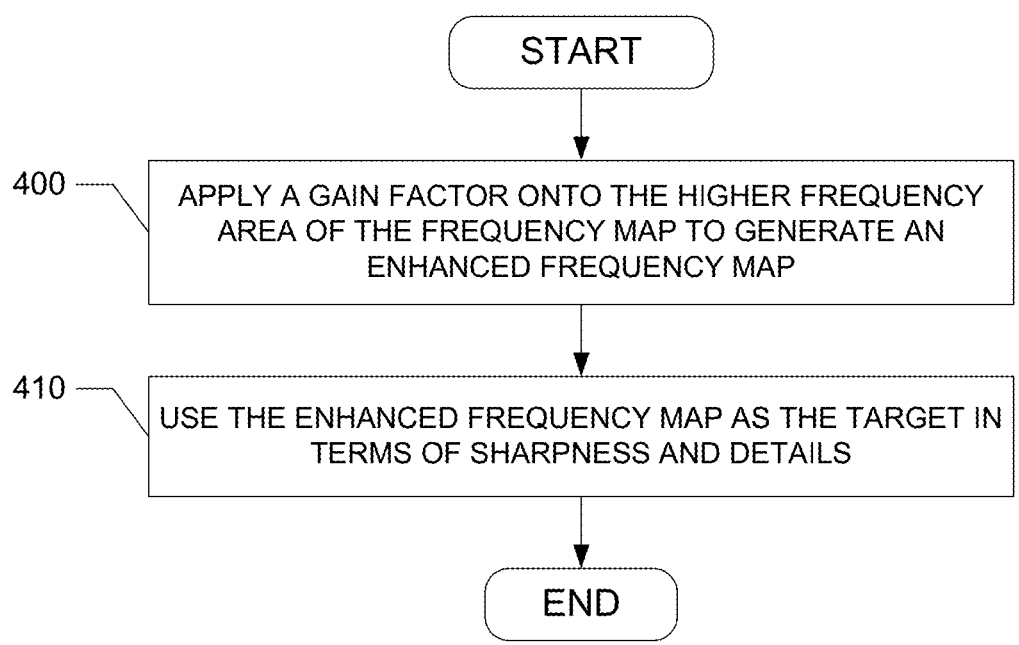
FIG. 4 is a detailed flow chart illustrating an adjustment process for controlling the target amount of sharpness and details in the upscaled output in accordance with one implementation of the present disclosure.

FIG. 4 is a detailed flow chart illustrating an adjustment process 330 for controlling the target amount of sharpness and details in the upscaled output in accordance with one implementation of the present disclosure. In the illustrated implementation of FIG. 4, the frequency map of the ground truth image is adjusted.

In one implementation, a gain factor is applied, at block 400, onto the higher frequency area of the frequency map to generate an enhanced frequency map. The enhanced frequency map is then used as the target in terms of sharpness and/or details, at block 410. The training process adjusts the frequency map of the output image as close as possible to the enhanced target, which will add more details and/or generate sharper image.

Figure 5:
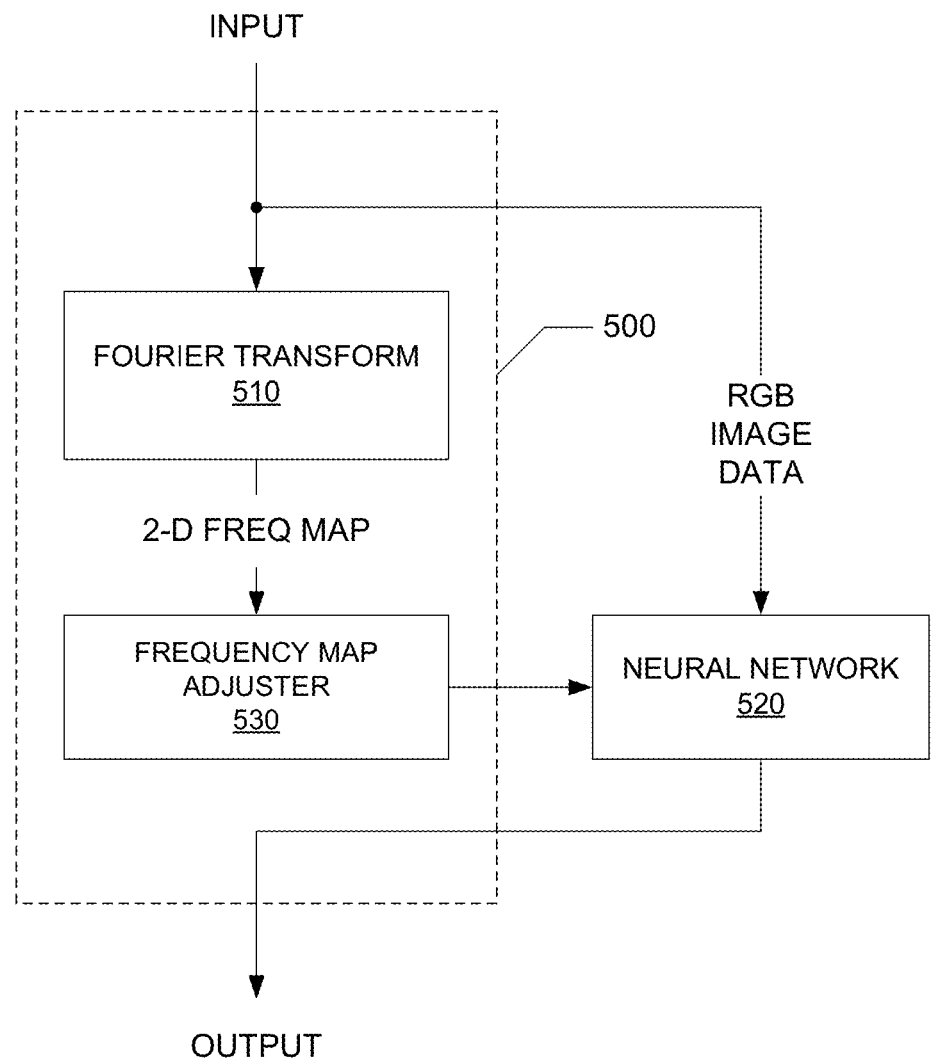
FIG. 5 is a block diagram showing a sharpness adjusting system in accordance with one implementation of the present disclosure.

FIG. 5 is a block diagram showing a sharpness adjusting system 500 in accordance with one implementation of the present disclosure. In the illustrated implementation of FIG. 5, the sharpness adjusting system 500 includes a Fourier Transform unit 510 and a frequency map adjuster 530.

In the illustrated implementation of FIG. 5, the Fourier Transform unit 510 is configured to apply a Fourier Transform function on the luminance channel of the input image to generate a 2-D frequency map of the grand truth image. In another implementation, a parameter other than luminance, which can provide the sharpness and level of details, can be used by the Fourier Transform unit 510. The frequency map adjuster 530 is configured to adjust the generated 2-D frequency map to control the target amount of sharpness and details in the upscaled output. The adjusted 2-D frequency map is then fed into an ML-based upscaling processor (e.g., a neural network 520) along with the RGB image data.

In one implementation, the sharpness adjusting system 500 is a system configured entirely with hardware including one or more digital signal processors (DSPs), general purpose microprocessors, application specific integrated circuits (ASICs), field programmable gate/logic arrays (FPGAs), or other equivalent integrated or discrete logic circuitry. In another implementation, the sharpness adjusting system 500 is configured with a combination of hardware and software.

Figure 6A:
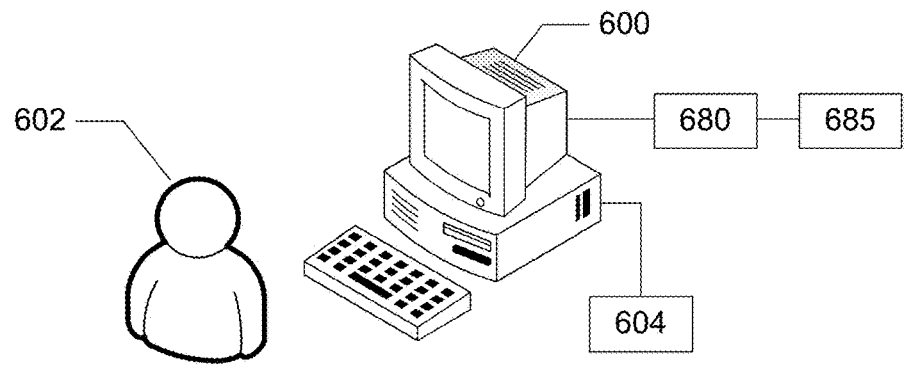
FIG. 6A is a representation of a sharpness adjusting system and a user in accordance with an implementation of the present disclosure.

FIG. 6A is a representation of a sharpness adjusting system 600 and a user 602 in accordance with an implementation of the present disclosure. The user 602 uses the computer system 600 to implement an application for sharpness adjustment in an upscaling process.

Figure 6B:
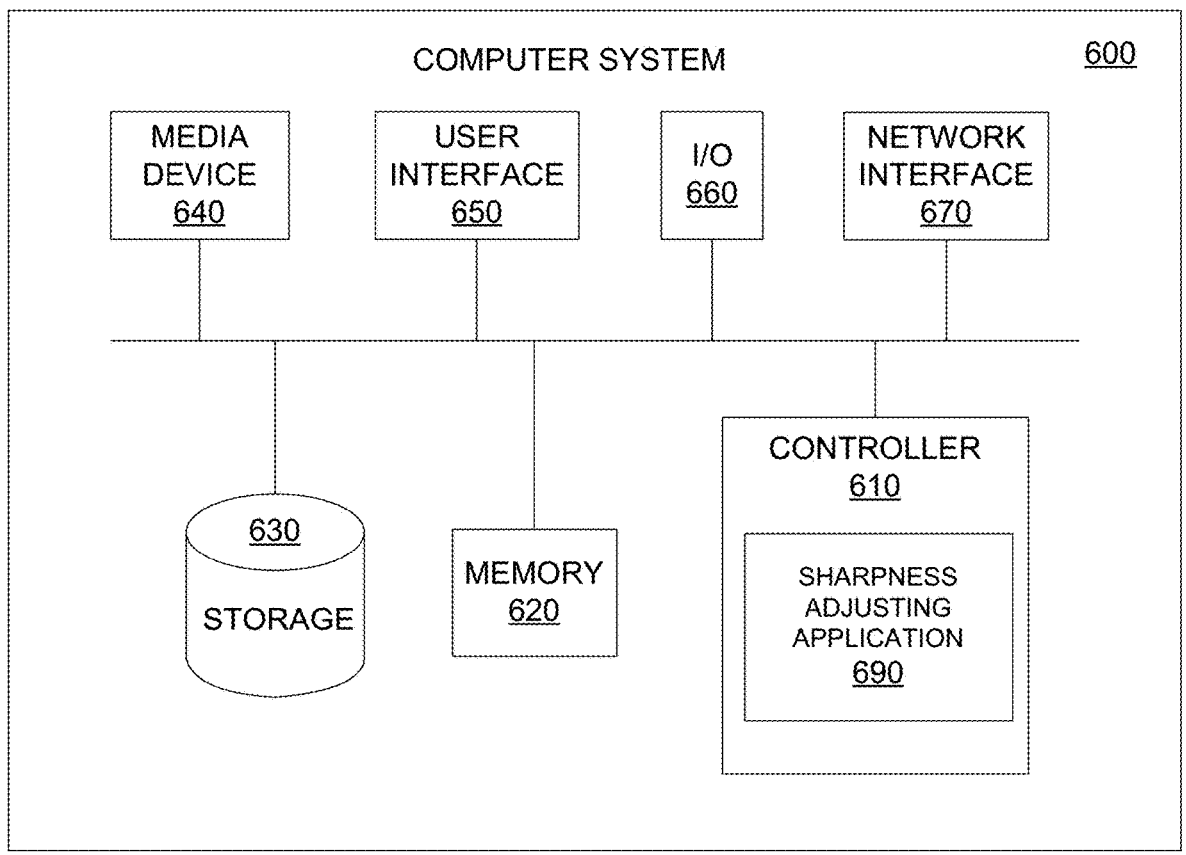
FIG. 6B is a functional block diagram illustrating the computer system hosting the sharpness adjusting application in accordance with an implementation of the present disclosure.

The computer system 600 stores and executes the sharpness adjusting application 690 of FIG. 6B. In addition, the computer system 600 may be in communication with a software program 604. Software program 604 may include the software code for the large-sized image upscaling application. Software program 604 may be loaded on an external medium such as a CD, DVD, or a storage drive, as will be explained further below.

Furthermore, computer system 600 may be connected to a network 680. The network 680 can be connected in various different architectures, for example, client-server architecture, a Peer-to-Peer network architecture, or other type of architectures. For example, network 680 can be in communication with a server 685 that coordinates engines and data used within the large-sized image upscaling application. Also, the network can be different types of networks. For example, the network 680 can be the Internet, a Local Area Network or any variations of Local Area Network, a Wide Area Network, a Metropolitan Area Network, an Intranet or Extranet, or a wireless network.

FIG. 6B is a functional block diagram illustrating the computer system 600 hosting the sharpness adjusting application 690 in accordance with an implementation of the present disclosure. A controller 610 is a programmable processor and controls the operation of the computer system 600 and its components. The controller 610 loads instructions (e.g., in the form of a computer program) from the memory 620 or an embedded controller memory (not shown) and executes these instructions to control the system. In its execution, the controller 610 provides the sharpness adjusting application 690 with a software system, such as to enable the creation and configuration of engines and data extractors within the large-sized image upscaling application. Alternatively, this service can be implemented as separate hardware components in the controller 610 or the computer system 600.

Memory 620 stores data temporarily for use by the other components of the computer system 600. In one implementation, memory 620 is implemented as RAM. In one implementation, memory 620 also includes long-term or permanent memory, such as flash memory and/or ROM.

Storage 630 stores data either temporarily or for long periods of time for use by the other components of computer system 600. For example, storage 630 stores data used by the sharpness adjusting application 690. In one implementation, storage 630 is a hard disk drive.

The media device 640 receives removable media and reads and/or writes data to the inserted media. In one implementation, for example, the media device 640 is an optical disc drive.

The user interface 650 includes components for accepting user input from the user of the computer system 600 and presenting information to the user 602. In one implementation, the user interface 650 includes a keyboard, a mouse, audio speakers, and a display. The controller 610 uses input from the user 602 to adjust the operation of the computer system 600.

The I/O interface 660 includes one or more I/O ports to connect to corresponding I/O devices, such as external storage or supplemental devices (e.g., a printer or a PDA). In one implementation, the ports of the I/O interface 660 include ports such as: USB ports, PCMCIA ports, serial ports, and/or parallel ports. In another implementation, the I/O interface 660 includes a wireless interface for communication with external devices wirelessly.

The network interface 670 includes a wired and/or wireless network connection, such as an RJ-45 or "Wi-Fi" interface (including, but not limited to 802.11) supporting an Ethernet connection.

The computer system 600 includes additional hardware and software typical of computer systems (e.g., power, cooling, operating system), though these components are not specifically shown in FIG. 6B for simplicity. In other implementations, different configurations of the computer system can be used (e.g., different bus or storage configurations or a multi-processor configuration).

The description herein of the disclosed implementations is provided to enable any person skilled in the art to make or use the present disclosure. Numerous modifications to these implementations would be readily apparent to those skilled in the art, and the principals defined herein can be applied to other implementations without departing from the spirit or scope of the present disclosure. Thus, the present disclosure is not intended to be limited to the implementations shown herein but is to be accorded the widest scope consistent with the principal and novel features disclosed herein.

Various implementations of the present disclosure are realized in electronic hardware, computer software, or combinations of these technologies. Some implementations include one or more computer programs executed by one or more computing devices. In general, the computing device includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., game controllers, mice and keyboards), and one or more output devices (e.g., display devices).

The computer programs include executable code that is usually stored in a persistent storage medium and then copied into memory at run-time. At least one processor executes the code by retrieving program instructions from memory in a prescribed order. When executing the program code, the computer receives data from the input and/or storage devices, performs operations on the data, and then delivers the resulting data to the output and/or storage devices.

Those of skill in the art will appreciate that the various illustrative modules and method steps described herein can be implemented as electronic hardware, software, firmware or combinations of the foregoing. To clearly illustrate this interchangeability of hardware and software, various illustrative modules and method steps have been described herein generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the present disclosure. In addition, the grouping of functions within a module or step is for ease of description. Specific functions can be moved from one module or step to another without departing from the present disclosure.

All features of each above-discussed example are not necessarily required in a particular implementation of the present disclosure. Further, it is to be understood that the description and drawings presented herein are representative of the subject matter which is broadly contemplated by the present disclosure. It is further understood that the scope of the present disclosure fully encompasses other implementations that may become obvious to those skilled in the art and that the scope of the present disclosure is accordingly limited by nothing other than the appended claims.

The invention claimed is:

1. A method for enabling adjustment of sharpness and details of an input image in upscaling, the method comprising:
   receiving the input image;
   applying a Fourier transform function on a brightness channel of the input image to generate a 2-D frequency map of the input image;
   adjusting the 2-D frequency map to control a target amount of sharpness and details in an upscaled output image including applying a gain factor onto a higher frequency area of the 2-D frequency map to generate an enhanced frequency map; and
   generating the upscaled output image by inputting the adjusted 2-D frequency map into an ML-based upscaler as an additional input channel along with standard color image data.

2. The method of claim 1, wherein the brightness channel comprises a luminance channel of the input image.

3. The method of claim 1, further comprising
   using the enhanced frequency map as a target for sharpness and details.

4. The method of claim 3, wherein using the enhanced frequency map as the target comprises
   adjusting the 2-D frequency map as close as possible to the target of the enhanced frequency map to add more details and sharpen the upscaled output image.

5. A sharpness adjusting system for enabling adjustment of sharpness and details of an input image in upscaling, the system comprising:
   a Fourier transform unit to receive the input image and apply a Fourier transform function on a brightness channel of the input image to generate a 2-D frequency map of the input image; and
   a frequency map adjuster to adjust to adjust the 2-D frequency map to control sharpness and details in an upscaled output image,
   wherein the frequency map adjuster is also configured to apply a gain factor onto a higher frequency area of the 2-D frequency map to generate an enhanced frequency map, and
   an output image generator to generate the upscaled output image by inputting the adjusted 2-D frequency map into an ML-based upscaler as an additional input channel along with standard color image data.

6. The system of claim 5, wherein the brightness channel comprises a luminance channel of the input image.

7. A non-transitory computer-readable storage medium storing a computer program to enable adjustment of sharpness and details of an input image in upscaling, the computer program comprising executable instructions that cause a computer to:
   receive the input image;
   apply a Fourier transform function on a brightness channel of the input image to generate a 2-D frequency map of the input image;
   adjust the 2-D frequency map to control a target amount of sharpness and details in an upscaled output image including applying a gain factor onto a higher frequency area of the 2-D frequency map to generate an enhanced frequency map; and
   generating the upscaled output image by inputting the adjusted 2-D frequency map into an ML-based upscaler as an additional input channel along with standard color image data.

8. The non-transitory computer-readable storage medium of claim 7, wherein the brightness channel comprises a luminance channel of the input image.

9. The non-transitory computer-readable storage medium of claim 7, further comprising executable instructions that cause the computer to
   use the enhanced frequency map as a target for sharpness and details.

10. The non-transitory computer-readable storage medium of claim 9, wherein the executable instructions that cause the computer to use the enhanced frequency map as the target comprise the executable instructions that cause the computer to
   adjust the 2-D frequency map as close as possible to the target of the enhanced frequency map to add more details and sharpen the upscaled output image.

* * * * *